(12) United States Patent
Zhou et al.

(10) Patent No.: US 11,171,731 B2
(45) Date of Patent: Nov. 9, 2021

(54) CLASSIFYING INTERFERING DEVICES USING CLASSIFIERS RECEIVED FROM A CENTRALIZED REPOSITORY

(71) Applicant: Hewlett Packard Enterprise Development LP, Houston, TX (US)

(72) Inventors: Qiang Zhou, Beijing (CN); Mohd Shahnawaz Siraj, San Jose, CA (US); Andre Beaudin, Montreal (CA); Berend Dunsbergen, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 106 days.

(21) Appl. No.: 16/427,744

(22) Filed: May 31, 2019

(65) Prior Publication Data

US 2019/0372691 A1 Dec. 5, 2019

(30) Foreign Application Priority Data

Jun. 1, 2018 (CN) .......................... 201810558153.6

(51) Int. Cl.
| | |
|---|---|
| *H04W 4/00* | (2018.01) |
| *H04B 17/345* | (2015.01) |
| *H04B 17/391* | (2015.01) |
| *G06K 9/62* | (2006.01) |
| *H04W 24/10* | (2009.01) |

(52) U.S. Cl.
CPC ......... *H04B 17/345* (2015.01); *G06K 9/6227* (2013.01); *H04B 17/391* (2015.01); *H04W 24/10* (2013.01)

(58) Field of Classification Search
CPC ................ H04B 17/345; H04B 17/391; H04B 1/7102; H04W 24/10; H04W 24/08
See application file for complete search history.

(56) References Cited

U.S. PATENT DOCUMENTS

| | | | |
|---|---|---|---|
| 7,929,508 B1 * | 4/2011 | Yucek ................... | H04W 72/06 370/338 |
| 8,175,539 B2 | 5/2012 | Diener et al. | |
| 8,660,212 B2 | 2/2014 | Ponnuswamy | |

(Continued)

OTHER PUBLICATIONS

Kim et al., "WiSlow: A Wi-Fi Network Performance Troubleshooting Tool for End Users", IEEE Conference on Computer Communications, 2014, pp. 862-870 (Year: 2014).*

(Continued)

*Primary Examiner* — Lan-Huong Truong
(74) *Attorney, Agent, or Firm* — Hewlett Packard Enterprise Patent Department (57) ABSTRACT

Example method includes: receiving, by an access point in a wireless local area network (WLAN), a plurality of wireless interference signals from an interfering device; deriving, by the access point, a fast Fourier transformation (FFT) pattern from the plurality of wireless interference signals received from the interfering device; transmitting, by the access point, the FFT pattern to a centralized repository that is remote to the access point; receiving, by the access point, a classifier from the centralized repository; and classifying, by the access point, the interfering device into a specific device type using the classifier received from the centralized repository based on the FFT pattern.

20 Claims, 4 Drawing Sheets

(56) References Cited

U.S. PATENT DOCUMENTS

| | | | |
|---|---|---|---|
| 8,929,936 B2 | 1/2015 | Mody et al. | |
| 9,538,388 B2 | 1/2017 | McHenry et al. | |
| 2011/0242984 A1* | 10/2011 | Ponnuswamy | H04L 41/22 370/241 |
| 2013/0060812 A1* | 3/2013 | Rothschild | G06F 16/9038 707/771 |
| 2016/0323750 A1 | 11/2016 | McHenry et al. | |
| 2018/0152843 A1* | 5/2018 | Coughlin | H04W 12/062 |

OTHER PUBLICATIONS

Cooklev, T. et al., A Cloud-based Approach to Spectrum Monitoring, (Research Paper), Mar. 26, 2015, Published in: IEEE Instrumentation & Measurement Magazine, vol. 18, No. 2, 5 Pgs.

Grimaldi. S. et al., An SVM-based Method for Classification of External Interference in Industrial Wireless Sensor and Actuator Networks, (Research Paper), Jun. 16, 2017, Journal of Sensor/Actuator Network, vol. 6, No. 2, 25 Pgs.

Selim, A. et al., Spectrum Monitoring for Radar Bands Using Deep Convolutional Neural Networks, (Research Paper), May 1, 2017, 7 Pgs.

Aung et al., "Detection and Classification of Unknown MTI and PBNI in Slow FH/BFSK Systems over Rayleigh Fading Channels", 2011, 5 pages.

Extended European Search Report received for EP Patent Application No. 19177482.7, dated Nov. 21, 2019, 6 pages.

Kim et al., "WiSlow: A Wi-Fi Network Performance Troubleshooting Tool for End Users", IEEE Conference on Computer Communications, 2014, pp. 862-870.

\* cited by examiner

CLASSIFYING INTERFERING DEVICES USING CLASSIFIERS RECEIVED FROM A CENTRALIZED REPOSITORY

BACKGROUND

Access points (APs) in wireless local area networks (WLANs) may support spectrum monitoring by periodically using its radio(s) to scan through different wireless communication channels in a wireless operating band for a predetermined duration. After each spectral scan duration, the radio(s) can be configured to be idle or provide wireless services until the beginning of the next spectral scan duration. During spectral scan, interfering signals detected by the radio(s) can be sampled and the measurements can be recorded within a number of discrete sampling windows. After each sampling window, a spectral report that contains data associated with the measurements recorded for that sampling window can be produced. Such data associated with the measurements can be processed using, for example, Fast Fourier Transform (FFT). APs can classify the type of interference with a set of pre-defined classifiers.

BRIEF DESCRIPTION OF THE DRAWINGS

The following detailed description references the drawings, wherein.

DETAILED DESCRIPTION

APs in WLANs may periodically scan through different wireless communication channels in a wireless operating frequency spectrum. During spectral scan, interfering signals detected by the APs can be sampled and a set of measurements can be recorded. A spectral report that contains data associated with the measurements recorded for that sampling window can be generated. Such data associated with the measurements can be processed using, for example, Fast Fourier Transform (FFT). Further, the APs can classify the type of interference with a set of pre-defined classifiers locally stored on the APs. Specifically, a FFT pattern that is uniquely associated with a classifier may be identified.

Due to limited memory size of the APs, the number of classifiers that can be stored locally in an AP is limited. When a new interference device type not covered by the set of pre-defined classifiers, then it cannot be classified correctly. Also, the set of pre-defined classifiers that are locally stored on the AP may be learned or generated from sample devices in a laboratory setting. Thus, there may be differences between an FFT pattern associated with the interference signal received by the AP and a FFT pattern that matches the interference device type corresponding to the interference signal. This may lead to the pre-defined classifiers not being able to recognize classify the interference signal correctly.

As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. For example, a "network device may refer to a network controller that comprises a hardware or a combination of hardware and software that enables connection between client devices and computer networks. In some implementations, a network device may refer to a server computing device (e.g., on-premise server, private, public, or hybrid cloud server) that comprises a hardware or a combination of hardware and software that can process and/or display network-related information. In some implementations, a network device may refer to an access point acting as a virtual master network controller among a cluster of access points.

Figure 1:
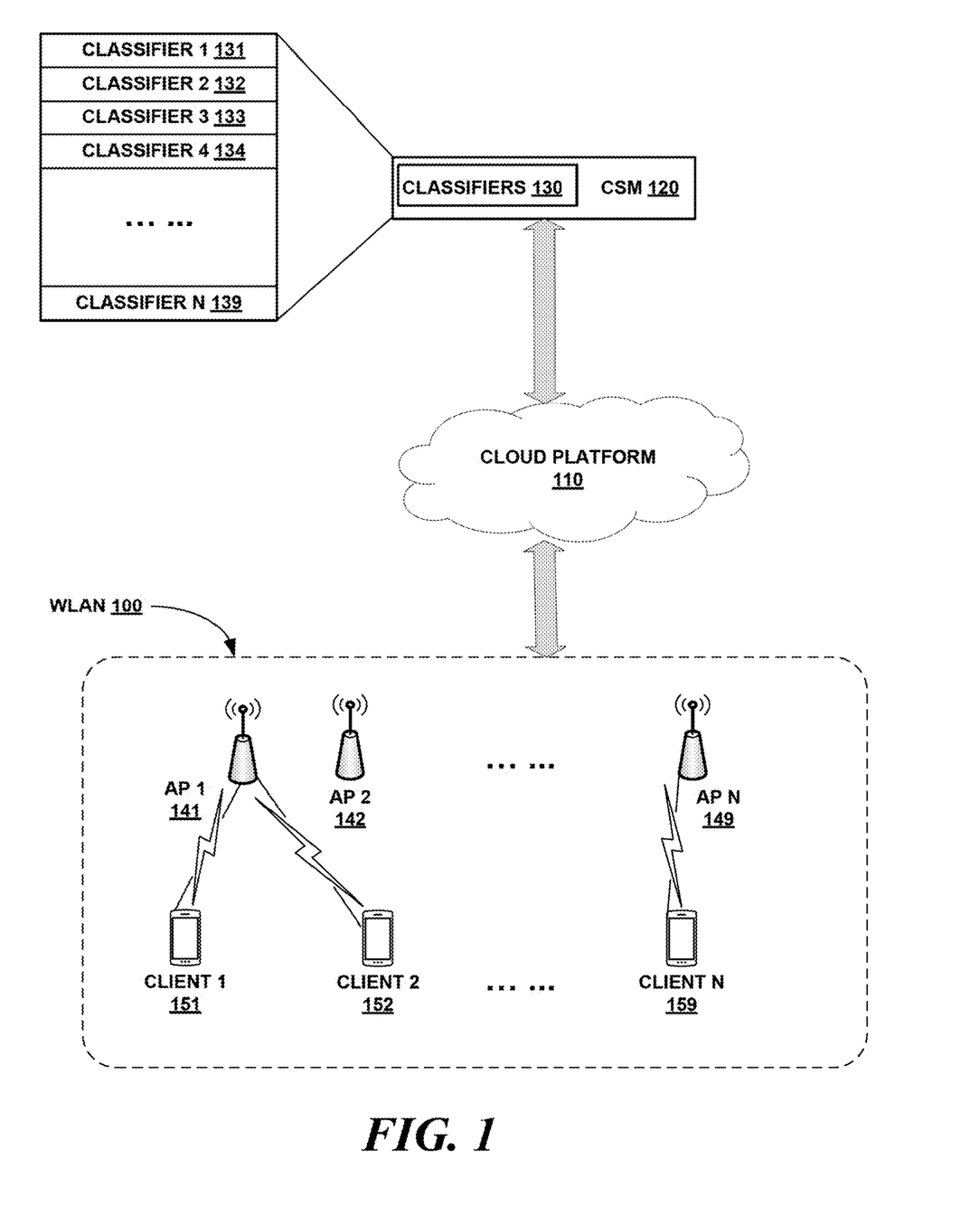
FIG. 1 is a block diagram of an example networking environment for classifying interfering devices using classifiers received from a centralized repository.

FIG. 1 is a block diagram of an example networking environment for classifying interfering devices using classifiers received from a centralized repository. Specifically, FIG. 1 includes at least a WLAN 100 and a cloud platform 110. WLAN 100 may include a plurality of network devices, including but not limited to access points AP 1 141, AP 2 142, . . . AP N 149, and a plurality of client devices, including but not limited to Client 1 151 Client 2 152, . . . , Client N 159. Each AP in WLAN 100 may provide wireless network access and services to one or more client devices. In the example WLAN 100, for illustration purposes only, assuming that Client 1 151 and Client 2 152 are both associated with AP 1 141; Client N 159 is associated with AP N 149; etc. In addition to client devices served by the APs (e.g., AP 1 141 to AP N 149) in WLAN 100, other devices may also transmit wireless signals at a particular frequency that overlaps with the frequency in at least one operating channel of an AP in the WLAN. In some examples, the AP may choose to operate on one of a plurality of supported wireless communication channels. In some examples, the frequency of interference signal may not overlap with the frequency of the current operating channel of the AP, it may nonetheless overlap with one of the plurality of supported wireless communication channels. The AP can detect such interference signals when it switches off its operating channel and perform a periodical spectral scan through a plurality of wireless communication channels supported by the AP.

A spectral report that contains data associated with the measurements recorded for the interference signal can be generated. Such data associated with the measurements can be processed using Fast Fourier Transform (FFT). FFT generally may refer to a mechanism that samples a signal over a period of time or space and divides it into a plurality of frequency components, which can also be referred to as FFT bins. These components or bins are single sinusoidal oscillations at distinct frequencies each with their own amplitude and phase. This transformation over the time period measured may be graphed, and a FFT pattern associated with the interference device type may be identified.

The FFT pattern may include a set of amplitudes and phases at each FFT bin. The APs (e.g., AP 1 141 to AP N 149) may use a plurality of classifiers to classify the interference signal based on the FFT pattern. Although FFT samples are used for illustration here, data associated with the measurements can be processed by using any other suitable signal processing methods such as, for example, fractional Fourier transform (FRFT), linear canonical transform (LCT), Laplace transform (LT), etc.

In some examples, the classifiers are pre-defined and locally stored on the APs. Wireless receivers in the APs can calibrate wireless signals corresponding to known interference sources in controlled environments (e.g., in a laboratory setting). The calibration process can capture the interference signatures as seen by a particular type of receiver and the signatures may include, for example, relative peak amplitudes, peak to average ratio, center frequency, pulse repetition frequency, hopping pattern, bandwidth, noise floor, etc. The APs may calibrate the identifying parameters of the interference source in best and worst case conditions. These calibrated values may be collectively referred to as an interference classifier (or "classifier"). The classifiers may be used for matching interference signatures captured during the AP's spectral monitoring process.

In some examples, the APs may have limited memory size, and thus unable to store a number of classifiers. In such scenarios, each AP may select a set of pre-defined classifiers that correspond to the interference signals frequently seen in the AP's operating channels in the past.

When an AP performs spectrum monitoring, the AP can scan an assigned channel and collect FFT bins. The collected FFT bins can then be checked using the pre-defined classifiers to determine whether they can be classified as an interference because they match a known interference FFT pattern. The particular pre-defined classifier used to classify the collected FFT bins may also provide information about the interference device type, vendor, etc.

When a detected signal is associated with a new interference source type that is not covered by the set of pre-defined classifiers, the AP may not be able to classify the interference device type correctly. Also, the set of pre-defined classifiers that are locally stored on the AP may be learned or generated from sample devices in a laboratory setting rather than industrial setting. Thus, there may be differences between an FFT pattern associated with the interference signal received by the AP and a FFT pattern that matches the interference device type corresponding to the interference signal. Such difference may prevent the interference signal from being correctly classified by the pre-defined classifiers.

Conventionally, in order to classify the new interference source type, a new classifier would be generated and included in a newer version of the operating system (OS) image for the access point. When the AP downloads and installs the newer version of OS image, the AP will have the new classifier locally stored and be able to classify any future interference signals of the new interference source type. However, the newer version of OS image is released periodically rather than on-demand. Thus, administrators and/or operators of WLAN 100 may need to wait for a long period before they can install and use the new classifier. Note that there was no way for the AP to make use of the new classifier without installing the newer version of the OS image on the AP.

According to examples of the present disclosure, a centralized spectrum monitoring service (CSM) 120 may be deployed to cloud platform 110. In some examples, CSM 120 could be located in a separated appliance. The appliance running CSM 120 in cloud platform 110 may have a much larger memory capacity compared to the access points (AP 1 141 to AP N 149) in WLAN 100. In some examples, CSM 120 may be run on a plurality of appliances simultaneously in a distributed fashion and utilize the memory from multiple appliances in cloud platform 110. Thus, CSM 120 can maintain a plurality of classifiers 130, for example, classifier 1 131, classifier 2 132, classifier 3 133, classifier 4 134, . . . , classifier N 139, etc., that are known to the network vendor.

When an AP (e.g., AP1 141) cannot classify an interference signal with the set of pre-defined classifiers that are locally stored on the AP, the AP can forward the FFT pattern to CSM 120 through cloud platform 110. FFT pattern may include interference signatures, including but not limited to, relative peak amplitudes, peak to average ratio, center frequency, pulse repetition frequency, hopping pattern, bandwidth, noise floor, etc., in different FFT bins. Examples of pre-defined classifiers may include classifiers that can identify interference source types such as microwaves, video bridges, cordless phones, etc.

After CSM 120 receives the FFT pattern from the AP, CSM 120 may perform a look up in a centralized repository. The centralized repository may store a plurality of classifiers 130. Classifiers 130 may be generated based on interference signatures (e.g., FFT patterns) collected a plurality of APs in a plurality of different networks supported by the network vendor. In some examples, the classifiers associated with the same class of interference source (e.g., microwave) may be different for different vendors. With the large memory capacity provided by cloud platform 110, CSM 120 can store different classifiers associated with different type of interference sources that correspond to different vendors of the interfering devices.

If CSM 120 identifies a classifier in the centralized repository 130 that matches the interference signatures, CSM 120 may transmit the identified classifier to the AP in a response. Then, the AP can update the set of locally stored classifiers to include the identified classifier, which can be used to classify the new interference source type. In some examples, the AP may maintain a subset of classifiers that are most frequently used by the AP based on interference signals received on its operating channels. In some examples, the AP may maintain a subset of classifiers that are most recently used by the AP based on interference signals received on its operating channels. In some examples, instead of transmitting the classifier, CSM 120 may transmit a classification result to the AP by applying the identified classifier to the interference signature(s) and/or FFT pattern(s) received from the AP. In some examples, Sometimes even with the large number of classifiers stored in the centralized repository, CSM 120 may still fail to identify a classifier that matches the interference signatures received from an AP in WLAN 100. In other words, the interference signal still cannot be recognized by existing classifiers 130 accessible to CSM 120. In such cases, CSM 120 may save the unknown interference signatures and return an unknown state to the AP in WLAN 100. Further, CSM 120 may divide the unknown interference signatures into clusters, and periodically apply a machine learning mechanism on the unknown interference signatures to generate a new classifier or update an existing classifier. Therefore, collecting unknown interference signatures by CSM 120 from multiple network devices in multiple WLANs can accelerate the development of the new classifier or the tuning of the existing classifier corresponding to the new interference source type. Note that the interference signatures here can be collected from multiple APs in multiple WLANs.

In some examples, when an AP (e.g., AP 141) connects to CSM 120, AP 141 and CSM 120 can exchange each classifier's version. If the version of a particular classifier in CSM 120 is newer than the version of the same classifier in AP 141, AP 141 can download the new version of the particular classifier by itself. Alternatively, CSM 120 can push an update including the new version of the particular classifier to the APs in WLAN 100 (including AP 141). The relevant internal classifier in each of the APs may be updated whenever an AP receives an update from CSM 120.

CSM 120 may generally refer to any advanced service running in cloud platform 110, which can maintain classifiers 130 for a large number and types of wireless interferences. In some examples, new classifiers may be learned from new interference FFT patterns. Existing classifiers can be refreshed and tuned with more new interference signatures data. Both new classifiers and existing classifiers can be updated to CSM 120 dynamically from the APs without interrupting existing network devices and services in WLAN 100.

In some examples, new classifiers can be dynamically downloaded to an AP in WLAN 100. For example, assuming that an AP's radio frequency (RF) environment changes because a new microwave is placed near the AP causing periodical interference on the AP's operating channel. The microwave may be from a new brand that is not associated with any known microwave interference signatures. In response to this RF environment change, the AP may update its locally stored classifier set to include a new classifier when the AP determines that it has detected the unknown microwave interference signals for a threshold number of times, and/or has received, from CSM 120 for a threshold number of times, a new classifier for the new brand of microwave interference source.

Meanwhile, spectrum monitoring service in cloud platform 110 can be provided based on the interference signatures and/or FFT patterns reported by the APs in WLAN 100. Such service may be licensed in a software as a service (SaaS) model. In some examples, cloud platform 110 may provide multiple levels of spectrum monitoring service. Specifically, a high level of spectrum monitoring service may use a highly comprehensive classifier database in CSM 120 for matching the interference signatures, and may charge a high license fee for consuming the service. On the other hand, a low level of spectrum monitoring service may use a simplified classifier database in CSM 120 for matching the interference signatures, and may charge a low license fee for consuming the service.

In some examples, the centralized repository storing classifiers 130 may be further divided into sub-groups. Each sub-group may store classifiers corresponding to a particular type of WLAN deployment. For example, in FIG. 1, classifier 1 131 and classifier 3 133 may belong to a first sub-group, whereas classifier 2 132 and classifier N 138 may belong to a second sub-group. The first sub-group may correspond to a controller-based WLAN deployment. Further, the second sub-group may correspond to a controller-less WLAN deployment. Sub-grouping classifiers may improve the efficiency of the spectrum monitoring service provided by CSM 120 because WLAN deployments of the same type may observe similar interference signatures and/or FFT patterns of the interference signals.

Figure 2:
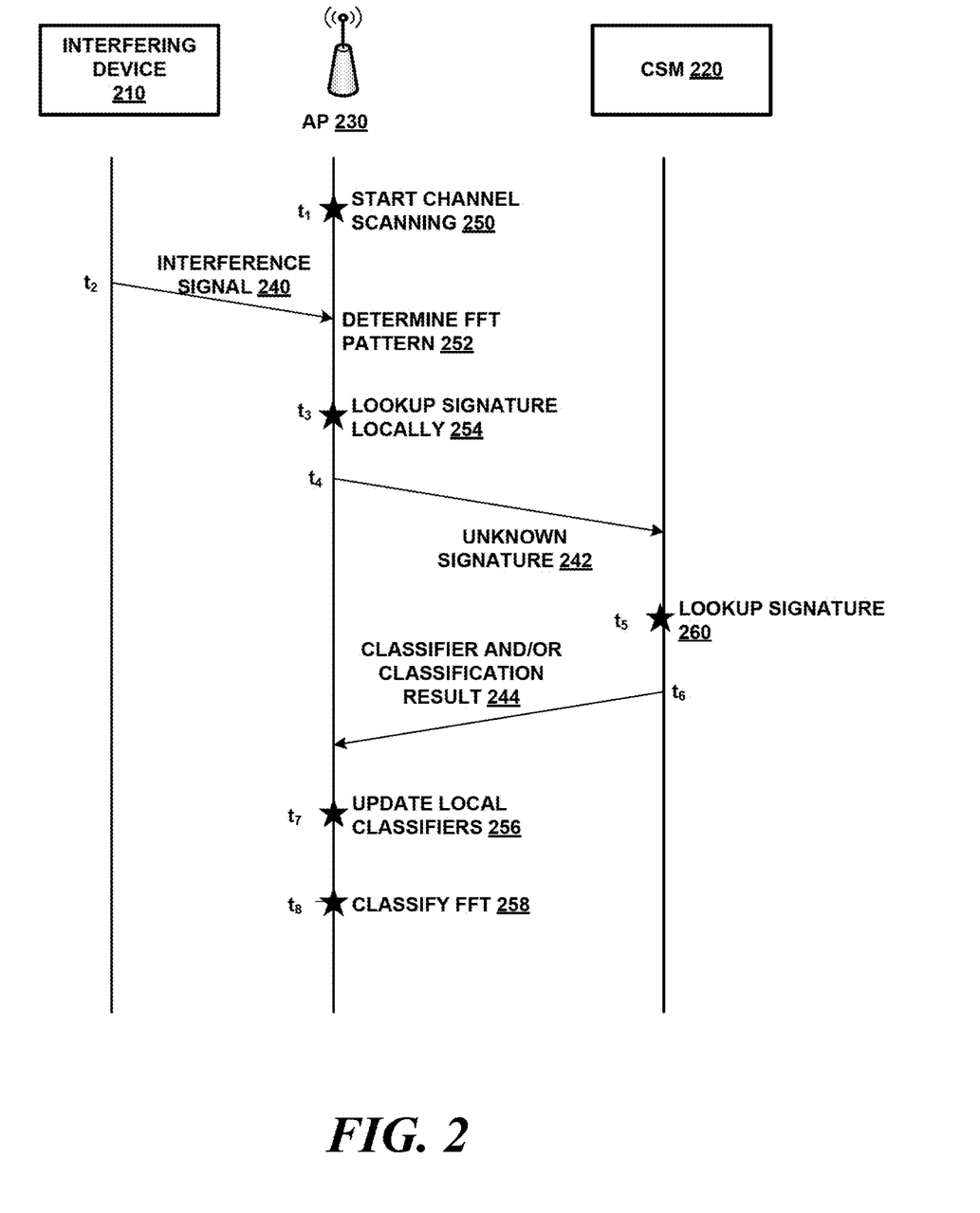
FIG. 2 is a sequence diagram of example communication exchanges to classify interfering devices using classifiers received from a centralized repository.

FIG. 2 illustrates a sequence diagram of example communication exchanges to classify interfering devices using classifiers received from a centralized repository. Specifically, FIG. 2 includes at least an interfering device 210, a CSM 220 and an AP 230. Interfering device 210 may be any electronic device capable of transmitting wireless signals on the operating wireless communication channel of at least one network device in a WLAN including AP 230. Examples of interfering device 210 may include a microwave, a cordless phone, etc. In the example illustrated in FIG. 2, at time point $t_1$, AP 230 starts channel scanning 250. At time point $t_2$, interfering device 210 transmits an interference signal 240, which is detected by AP 230 while scanning a particular wireless channel. Then, AP 230 may determine a FFT pattern 252, for example, by sampling interference signal 240 over a period of time and dividing interference signal 240 into a plurality of FFT bins at different frequencies in the particular wireless channel. Next, at time point $t_3$, AP 230 may look up the interference signatures locally 254 in an internally stored set of pre-defined classifiers. For illustration purposes only, assuming that AP 230 determines that interference signal 240 contains an unknown signature 242. At time point $t_4$, AP 230 may transmit unknown signature 242 to CSM 220. Subsequently, CSM 220 can look up 260 the received unknown signature 242 at time point $t_5$. If a matching classifier is found, CSM may return the classifier and/or the classification result 244 to AP 230 at time point $t_6$. If a new classifier or an updated version to an existing classifier is received by AP 230, at time point $t_7$, AP 230 can update its local classifiers 256. Furthermore, if a classifier rather than a classification result is transmitted to AP 230, AP 230 can use the classifier to classify FFT pattern 258 at time point $t_8$.

Figure 3:
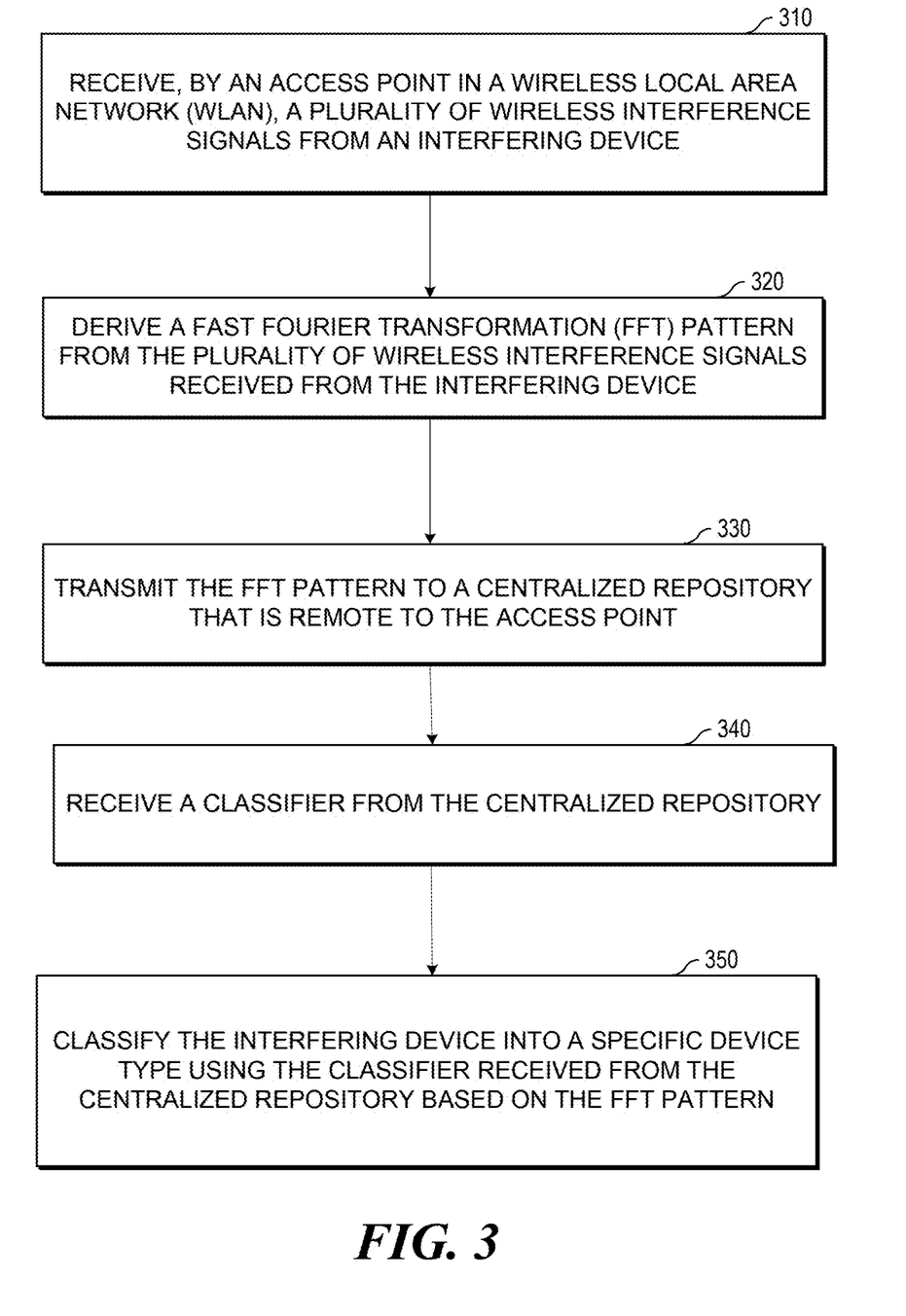
FIG. 3 is a flowchart of an example process of classifying interfering devices using classifiers received from a centralized repository.

FIG. 3 is a flowchart of an example process of classifying interfering devices using classifiers received from a centralized repository. During operations, an example network device (e.g., an access point in a WLAN) can receive a plurality of wireless interference signals from an interfering device (operation 310). Then, the network device may derive a fast Fourier transformation (FFT) pattern from the plurality of wireless interference signals received from the interfering device (operation 320). Further, the network device may transmit the FFT pattern to a centralized repository that is remote to the access point (operation 330). Subsequently, the network device can receive a classifier from the centralized repository (operation 340). Moreover, the network device can classify the interfering device into a specific device type using the classifier received from the centralized repository based on the FFT pattern (operation 350).

In some examples, the local repository may correspond to an initial version of operating system image installed on the access point when the access point was provisioned in the WLAN. The classifier may be included in a subsequent version of operating system image that is not installed on the network device (e.g., the access point). The network device (e.g., access point) may use the classifier without installing the subsequent version of operating system image.

In some examples, the network device may further look up the FFT pattern in its local repository, and determine whether the local repository includes the FFT pattern. If the local repository does not include the FFT pattern, the network device (e.g., the access point) may transmit the FFT pattern to the centralized repository.

In some examples, the network device (e.g., the access point) may update the local repository to include the classifier in response to receiving the classifier from the centralized repository.

In some examples, the network device (e.g., the access point) may transmit the FFT pattern to the central repository regardless of whether the local repository includes the FFT pattern in a bypass mode.

In some examples, a cloud platform can notify at least a second network device (e.g., a second access point) located within a radio frequency (RF) neighborhood of the network device (e.g., the access point) in the WLAN to switch to the bypass mode, and transmit a second FFT pattern to the centralized repository regardless of whether a second local repository at the second network device (e.g., the second access point) includes the second FFT pattern. The second FFT pattern is derived at the second access point based on the plurality of wireless interference signals received by the second access point.

In some examples, the central repository can gather FFT patterns from a plurality of access points in the WLAN.

In some examples, the central repository can a machine learning mechanism to generate a new classifier or update an existing classifier to classify the FFT pattern derived by the network device (e.g., the access point).

Figure 4:
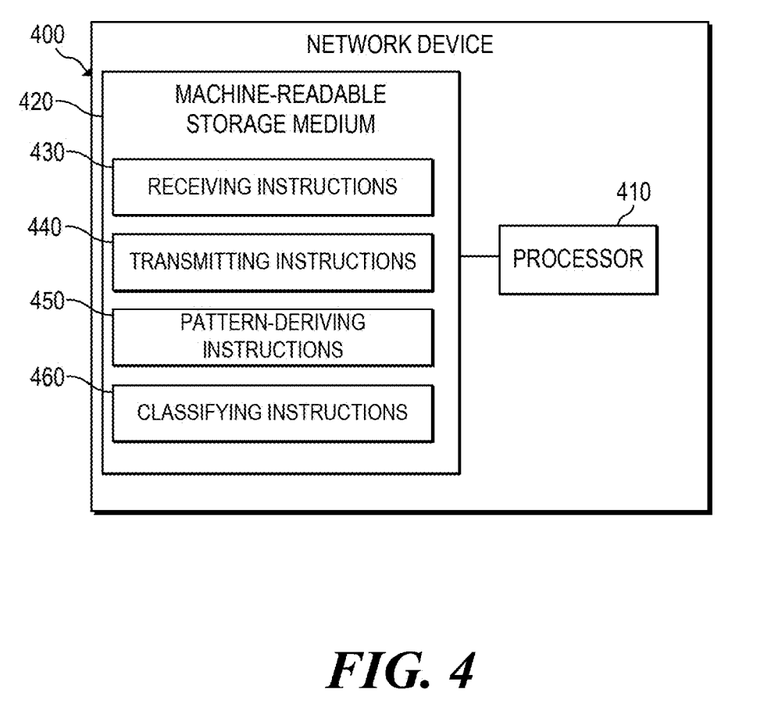
FIG. 4 is a block diagram of an example network device to classify interfering devices using classifiers received from a centralized repository.

FIG. 4 is a block diagram of an example network device to classify interfering devices using classifiers received from a centralized repository. As used herein, a network device may be implemented, at least in part, by a combination of hardware and programming. For example, the hardware may comprise at least one processor (e.g., processor 410) and the programming may comprise instructions, executable by the processor(s), stored on at least one machine-readable storage medium (e.g., 420). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 410 may fetch, decode, and execute instructions stored on storage medium 420 to perform the functionalities described below in relation to receiving instructions 430, transmitting instructions 440, pattern-deriving instructions 450, and classifying instructions 460. In other examples, the functionalities of any of the instructions of storage medium 420 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 4, storage medium 420 may be implemented by one machine-readable storage medium, or multiple machine-readable storage media.

Although network device 400 includes at least one processor 410 and machine-readable storage medium 420, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 430-460 may be executed by processor 410 to: receive a plurality of wireless interference signals from an interfering device; derive a fast Fourier transformation (FFT) pattern from the plurality of wireless interference signals received from the interfering device; transmit the FFT pattern to a centralized repository that is remote to the access point; receive a classifier from the centralized repository; classify the interfering device into a specific device type using the classifier received from the centralized repository based on the FFT pattern; look up the FFT pattern in the local repository; determine that the local repository does not include the FFT pattern; transmit the FFT pattern to the centralized repository in responsive to the local repository not including the FFT pattern; update the local repository to include the classifier in response to receiving the classifier from the centralized repository; etc.

We claim:

1. A method comprising:
   receiving, by an access point in a wireless local area network (WLAN), a plurality of wireless interference signals from an interfering device;
   deriving, by the access point, a fast Fourier transformation (FFT) pattern from the plurality of wireless interference signals received from the interfering device;
   transmitting, by the access point, the FFT pattern to a centralized repository that is remote to the access point;
   receiving, by the access point, a classifier or a classifying result from the centralized repository; and
   classifying, by the access point, the interfering device into a specific device type using the classifier received from the centralized repository based on the FFT pattern.

2. The method of claim 1, further comprising searching a local repository for the FFT pattern, wherein the local repository corresponds to an initial version of operating system image installed on the access point when the access point was provisioned in the WLAN.

3. The method of claim 2, wherein the classifier is included in a subsequent version of operating system image that is not installed on the access point, and wherein the access point uses the classifier without installing the subsequent version of operating system image.

4. The method of claim 1, further comprising:
   looking up, by the access point, the FFT pattern in a local repository; and
   determining that the local repository does not include the FFT pattern, wherein transmitting the FFT pattern to the centralized repository is responsive to the local repository not including the FFT pattern.

5. The method of claim 4, further comprising:
   updating, by the access point, the local repository to include the classifier in response to receiving the classifier from the centralized repository.

6. The method of claim 4, wherein the access point transmits the FFT pattern to the central repository regardless of whether the local repository includes the FFT pattern in a bypass mode.

7. The method of claim 6, wherein a cloud platform notifies at least a second access point located within a radio frequency (RF) neighborhood of the access point to switch to the bypass mode, and transmit a second FFT pattern, which is derived at the second access point based on the plurality of wireless interference signals received by the second access point, to the centralized repository regardless of whether a second local repository at the second access point includes the second FFT pattern.

8. The method of claim 1, wherein the central repository gathers FFT patterns of a plurality of access points in the WLAN including the access point.

9. The method of claim 1, wherein the central repository uses a machine learning mechanism to generate a classifier to classify the FFT pattern derived by the access point.

10. A network device, comprising at least:
a memory;
a processor executing instructions from the memory to:
receive a plurality of wireless interference signals from an interfering device;
derive a fast Fourier transformation (FFT) pattern from the plurality of wireless interference signals received from the interfering device;
transmit the FFT pattern to a centralized repository that is remote to the network device;
receive a classifier or a classifying result from the centralized repository; and
classify the interfering device into a specific device type using the classifier received from the centralized repository based on the FFT pattern.

11. The network device of claim 10, further comprising searching a local repository for the FFT pattern, wherein the local repository corresponds to an initial version of operating system image installed on the access point when the network device was provisioned in the WLAN.

12. The network device of claim 11, wherein the classifier is included in a subsequent version of operating system image that is not installed on the network device, and wherein the network device uses the classifier without installing the subsequent version of operating system image.

13. The network device of claim 10, wherein the processor further executes the instructions from the memory to:
look up the FFT pattern in a local repository; and
determine that the local repository does not include the FFT pattern, wherein transmitting the FFT pattern to the centralized repository is responsive to the local repository not including the FFT pattern.

14. The network device of claim 13, wherein the processor further executes the instructions from the memory to:
update the local repository to include the classifier in response to receiving the classifier from the centralized repository.

15. The network device of claim 13, wherein the network device transmits the FFT pattern to the central repository regardless of whether the local repository includes the FFT pattern in a bypass mode.

16. The network device of claim 15, wherein a cloud platform notifies at least a second network device located within a radio frequency (RF) neighborhood of the network device to switch to the bypass mode, and transmit a second FFT pattern, which is derived at the second network device based on the plurality of wireless interference signals received by the second network device, to the centralized repository regardless of whether a second local repository at the second network device includes the second FFT pattern.

17. The network device of claim 10, wherein the central repository gathers FFT patterns of a plurality of network devices in the WLAN including the network device.

18. The network device of claim 10, wherein the central repository uses a machine learning mechanism to generate a classifier to classify the FFT pattern derived by the network device.

19. A non-transitory machine-readable storage medium encoded with instructions executable by at least one hardware processor of a network device, the machine-readable storage medium comprising instructions to:
receive a plurality of wireless interference signals from an interfering device;
derive a fast Fourier transformation (FFT) pattern from the plurality of wireless interference signals received from the interfering device;
transmit the FFT pattern to a centralized repository that is remote to an access point;
receive a classifier or a classifying result from the centralized repository; and
classify the interfering device into a specific device type using the classifier received from the centralized repository based on the FFT pattern, wherein the classifier is included in a subsequent version of operating system image that is not installed on the access point, and wherein the access point uses the classifier without installing the subsequent version of operating system image.

20. The non-transitory machine-readable storage medium of claim 19, further comprising instructions to:
look up the FFT pattern in a local repository;
determine that the local repository does not include the FFT pattern, wherein transmitting the FFT pattern to the centralized repository is responsive to the local repository not including the FFT pattern; and
update the local repository to include the classifier in response to receiving the classifier from the centralized repository.

* * * * *